US007730452B1

(12) United States Patent
Li et al.

(10) Patent No.: US 7,730,452 B1
(45) Date of Patent: Jun. 1, 2010

(54) TESTING A COMPONENT OF A DISTRIBUTED SYSTEM

(75) Inventors: Jun Li, Palo Alto, CA (US); Keith E. Moore, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1247 days.

(21) Appl. No.: 11/264,799

(22) Filed: Nov. 1, 2005

(51) Int. Cl.
*G06F 9/44* (2006.01)
(52) U.S. Cl. ...................... 717/124; 717/125
(58) Field of Classification Search .......... 717/124–125
See application file for complete search history.

(56) References Cited

U.S. PATENT DOCUMENTS

| | | | | |
|---|---|---|---|---|
| 6,898,784 | B1 * | 5/2005 | Kossatchev et al. | 717/126 |
| 6,934,934 | B1 * | 8/2005 | Osborne et al. | 717/126 |
| 7,020,574 | B2 * | 3/2006 | Eden et al. | 702/122 |
| 7,334,162 | B1 * | 2/2008 | Vakrat et al. | 714/38 |
| 7,373,636 | B2 * | 5/2008 | Barry et al. | 717/124 |
| 7,603,658 | B2 * | 10/2009 | Subramanian et al. | 717/126 |
| 2003/0056200 | A1 | 3/2003 | Li et al. | |
| 2003/0098879 | A1 | 5/2003 | Matthews | |
| 2004/0073658 | A1 * | 4/2004 | Oran et al. | 709/224 |
| 2006/0037002 | A1 * | 2/2006 | Vinberg et al. | 717/124 |
| 2006/0130041 | A1 * | 6/2006 | Pramanick et al. | 717/168 |
| 2008/0222609 | A1 * | 9/2008 | Barry et al. | 717/124 |
| 2008/0270942 | A1 * | 10/2008 | Petersen et al. | 715/840 |

OTHER PUBLICATIONS

Jaeger, T. et al., "Synchronous IPC over Transparent Monitors", donwloaded Oct. 31, 2005.
Sankak, S. et al., "Specifying and Testing Software Components Using ADL", Sun Microsystems Laboratories, Inc., Mountain View, CA, Apr. 1994.
Hoffman, D., "A Case Study in Module Testing", IEEE, 1989, p. 100-105.
Enfocus, http://www.enfocus.com/products/overview.php?nr=3, downloaded Oct. 31, 2005.
IBM Rational, http://www-306.ibm.com/software/rational/, downloaded Oct. 31, 2005.

* cited by examiner

*Primary Examiner*—Anna Deng

(57) ABSTRACT

In a method for testing a component of a distributed system, a first invocation request is sent to the component, where the first invocation request includes an identifier. A second invocation request is sent to a second component, where the second invocation request carries the identifier from the first invocation request. In addition, the second component switches behavior based upon the identifier, where the switching of behavior of the second component is employed to test the component.

20 Claims, 7 Drawing Sheets

TESTING A COMPONENT OF A DISTRIBUTED SYSTEM

BACKGROUND

Distributed software accounts for a large percentage of software programs produced today. Distributed software is typically implemented as multiple components interacting in a single computer system or in multiple computer systems interconnected by networks both large and small. Rigorous testing is often required in order to produce a robust, high-quality, and reliable distributed software system. However, testing of such distributed software systems remains difficult because the interaction of components with other components throughout the system or over multiple systems is often highly complex. The complexity is due, in large part, to the difficulty in determining if erroneous code lies within the components, within the other components, or within the interactions between the components, especially when the component interacts with a relatively large number of other components.

Conventionally, each component of the distributed software is individually tested to validate the internal logic of each component, in an effort to produce error-free code for each component. In addition, system integration testing is performed to focus on testing of component interactions only when it is determined that each component contains error-free code. This type of testing, however, is difficult and time consuming. It would therefore be desirable to have a testing system that does not suffer from the drawbacks and difficulties associated with conventional testing schemes.

SUMMARY

A method for testing a component of a distributed system is disclosed herein. In the method, a first invocation request is sent to the component, where the first invocation request includes an identifier. A second invocation request is sent to a second component, where the second invocation request carries the identifier from the first invocation request. In addition, the second component switches behavior based upon the identifier, where the switching of behavior of the second component is employed to test the component.

BRIEF DESCRIPTION OF THE DRAWINGS

Embodiments of the invention are illustrated by way of example and without limitation in the accompanying figures in which like numeral references refer to like elements, and wherein.

DETAILED DESCRIPTION

For simplicity and illustrative purposes, various examples of systems and methods of the invention are described. In the following description, numerous specific details are set forth in order to provide a thorough understanding of the examples. It will be apparent however, to one of ordinary skill in the art, that the examples may be practiced without limitation to these specific details. In other instances, well known methods and structures have not been described in detail so as not to unnecessarily obscure the examples.

Systems and methods for efficiently testing the interactions between a component under test and stub components are described herein. More particularly, various methods and systems for testing how the component responds to a variety of conditions as simulated by the stub components are described herein. In this regard, the stub components may be programmed to emulate various behaviors which may occur during a final implementation of the component. For instance, when a call is made from the component, the stub components may respond with one of the programmed behaviors depending upon an identifier appended to the call, as described in greater detail herein below. In one regard, therefore, the component may be tested in a relatively controlled environment and the tests may be performed without a centralized coordinator in the test execution environment.

As also described in greater detail below, the interactions between the component and the stub components may be tested without requiring additions or modifications to the code contained in the component. As such, the amount of time required to perform the testing may be substantially minimized and the component may be tested under final implementation scenarios.

Figure 1A:
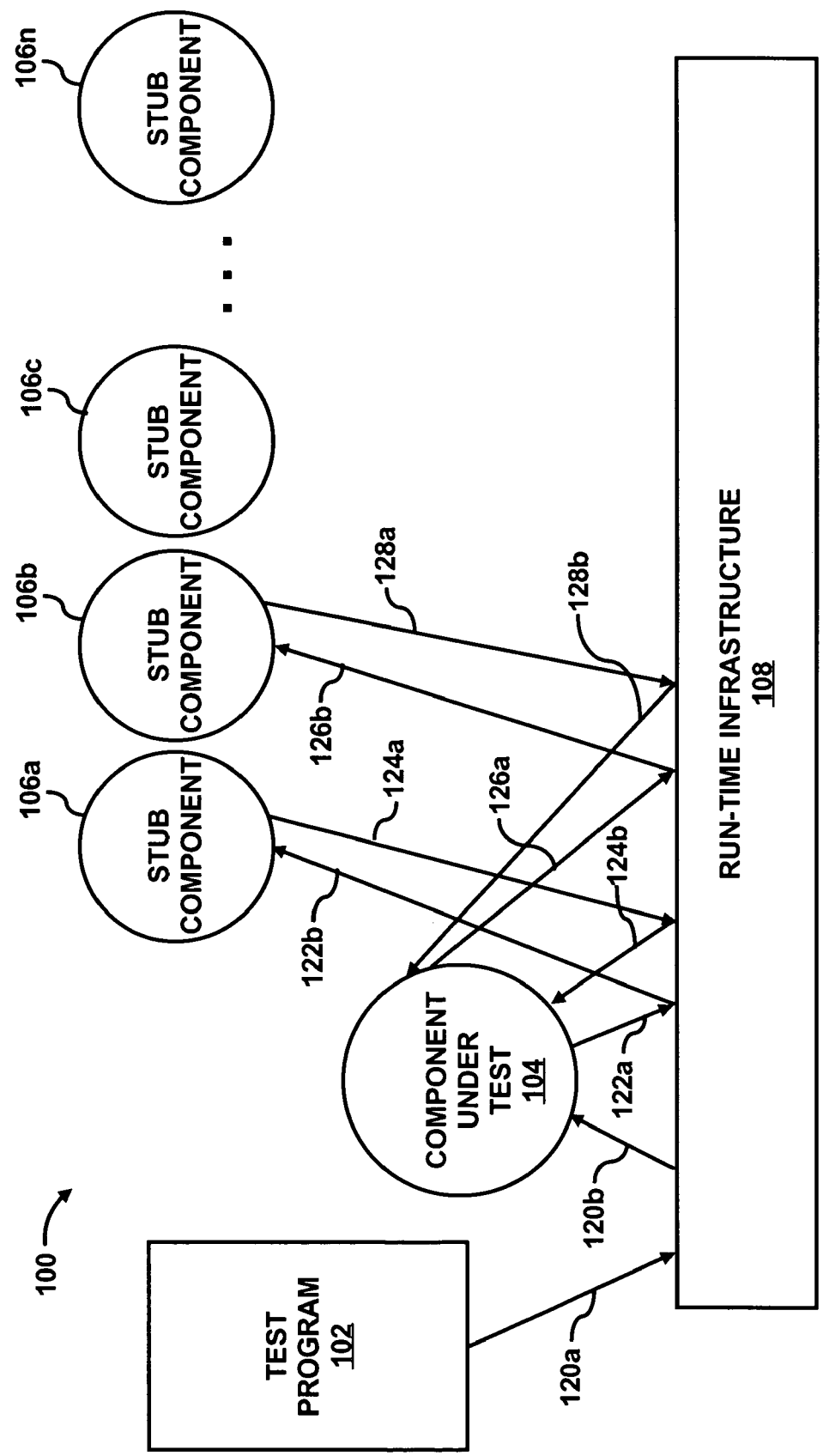
FIG. 1A shows a block diagram of a system for testing a component of a distributed system in accordance with an embodiment of the invention.

With reference first to FIG. 1A, there is shown a block diagram of a system 100 for testing a component 104 of a distributed system. The system 100 includes a test program 102, a component under test 104 (hereinafter "component 104"), a plurality of stub components 106a-106n, and a run-time infrastructure 108. The ellipses (" . . . ") between the stub component 106a and the stub component 106n indicate that any reasonably suitable number of stub components 106a-106n may be included in the system 100. In addition, it should be understood that the system 100 may include additional elements and that some of the elements described herein may be removed and/or modified without departing from a scope of the system 100.

Generally speaking, the test program 102 may comprise a software program that implements test cases, which may belong to a test suite. Test cases may be defined as a set of inputs, execution preconditions, and expected outcomes, developed for a particular objective, such as to exercise a particular program path or to verify compliance with a specific requirement. The test suite may be defined as a collection of one or more test cases for the component 104.

The stub components 106a-106n may be defined as special-purpose implementations of the software components that the component 104 calls or otherwise is dependent on in a final integrated system. The stub components 106a-106n may emulate the functionalities of the corresponding software components either partially or fully.

A depiction of a manner in which the elements of the system 100 may interact is provided through the following example. In this example, a user may initialize one or more test cases on the component 104 through operation of the test program 102, in which the component 104 is designed to interact with an e-mail server and a document repository server. Using the examples described herein, the stub components 106a-106n may be programmed to emulate various behaviors of the e-mail server and the document repository server. In this regard, the stub components 106a-106n may be used to emulate a variety of possible responses from the e-mail server and the document repository server without having to modify an actual e-mail server or an actual document repository server.

The stub components 106a-106n in this example may be programmed to, for instance, not respond, respond with a very large work load, respond after a significant time delay, etc., thus testing how the component 104 reacts to a variety of different conditions. In addition, the interactions between the component 104 and the stub components 106a-106n may be tested without having to communicate remotely with other systems. In this regard, the interactions of the component 104 with remote components may be tested in a controlled environment without requiring the use of remote system resources.

In the example above and as used throughout the present disclosure, the component 104 may be tested through use of various identifiers. The identifiers may broadly be defined as instructions for the stub components 106a-106n to behave in a predefined manner. In other words, the stub components 106a-106n may be programmed to respond in a predefined manner according to the identifier received by the stub components 106a-106n. In the example above, the stub components 106a-106n may be programmed to not respond, respond with a large work load, etc., according to the respective identifier received by the stub components 106a-106n.

The identifiers may identify the particular test cases to be run on the component 104 and the stub components 106a-106n. In addition, the identifiers may include one or both of test case identifiers and test suite identifiers. As the names suggest, test case identifiers are identifiers associated with test cases and test suite identifiers are identifiers associated with test suites. When there are multiple test suites, and test cases contained in the multiple test suites, a unique test case may be identified by a particular test case identifier and a particular test suite identifier. In any respect, the test case identifiers and the test suite identifiers may comprise predetermined values chosen to represent certain conditions to be tested.

The run-time infrastructure 108 may be defined as a dynamically bindable package of one or more programs managed as a unit and accessed through documented interfaces that may be discovered at run-time. In addition, and as described in greater detail herein below, the run-time infrastructure 108 is configured to track interactions between the test program 102, the component 104, and the stub components 106a-106n, by tracking calls and responses between these elements. More particularly, for instance, the run-time infrastructure 108 may track and maintain a sequence of calls made between these elements.

When the test cases have both test case identifiers and test suite identifiers, the run-time infrastructure 108 may merge the two identifiers into a single identifier that is unique in the system 100, for the calls between the test program 102, the component 104, and the stub components 106a-106n. For example, the test case with the test case identifier of "1" and the test suite identifier of "2" may be merged into a single identifier of "00010002".

Correspondingly, when a call reaches the stub components 106a-106n, the run-time infrastructure 108 may perform the reconstruction of the test case identifier and the test suite identifier, such that the stub components 106a-106n may retrieve these two identifiers and switch the stub component 106a-106n behavior based on the received test case identifier and test suite identifier.

A sequence may contain the list of calls, as well as the ordering of the calls and the inputs and outputs to the calls, in order to produce a call history, which may be used in a debugging process. For instance, it may be determined that a particular test case where the stub component 106a delays in responding for a particular time and the stub component 106b responds with an error code, causes the component 104 to crash upon receiving an expected response from the stub component 106c. Because the sequence of calls and the inputs and outputs to the calls are recorded by the run-time infrastructure 108, a user may determine that the inappropriate delay from the stub component 106a caused the component 104 to eventually crash. This discovery may not be possible if the sequence of calls and the inputs and outputs to the calls were not maintained by the run-time infrastructure 108.

An example of a run-time infrastructure configured to maintain a sequence of calls and pass messages from which call inputs and outputs may be reconstructed between components, may be found in co-pending and commonly assigned U.S. patent application Ser. No. 09/955,764 filed on Sep. 19, 2001, and entitled "Run-Time Monitoring in Component-Based System," the disclosure of which is hereby incorporated by reference in its entirety.

Figure 1B:
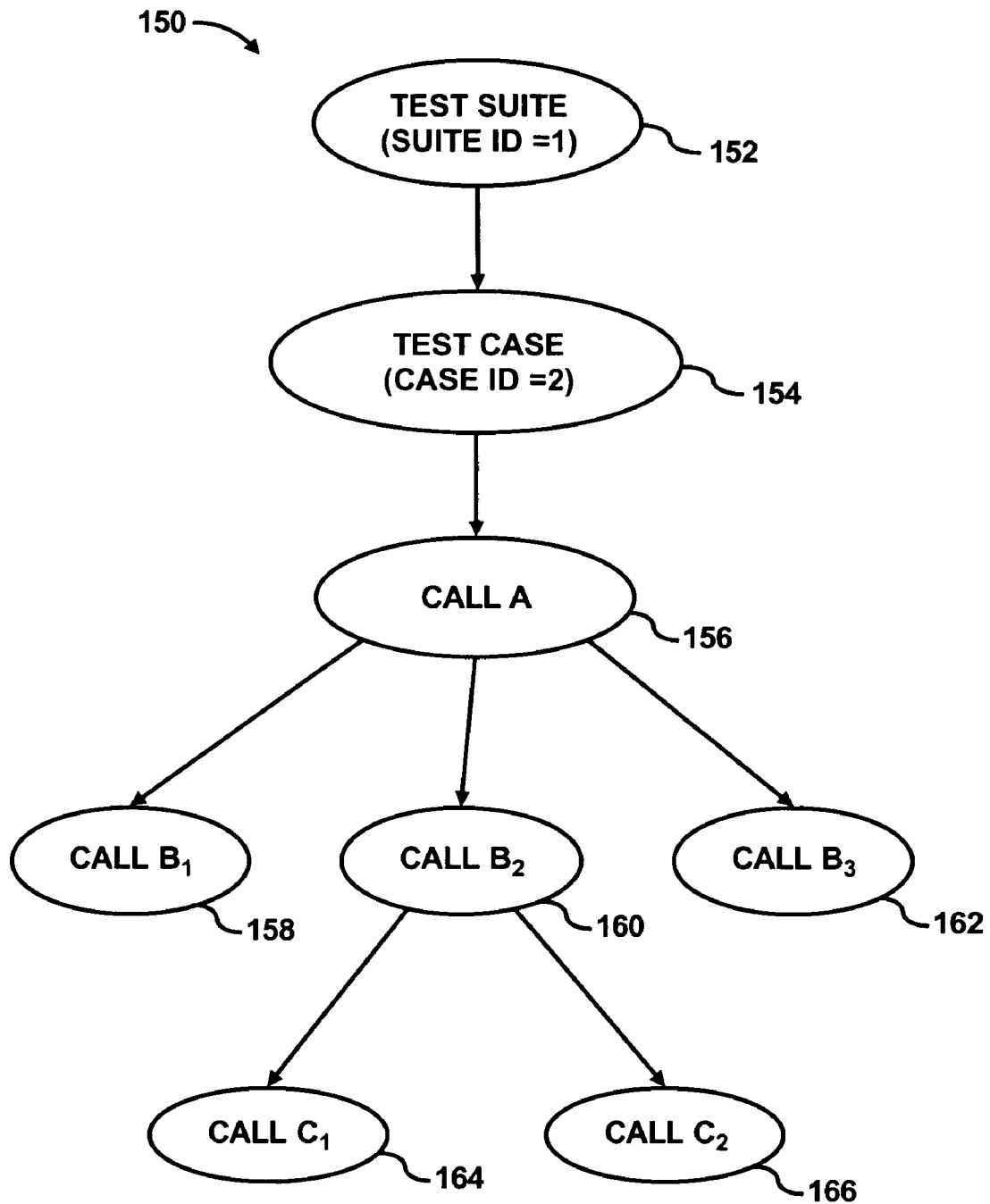
FIG. 1B shows an illustration of a call graph created from a sequence of calls captured by a run-time infrastructure in accordance with an embodiment of the invention.

An example of a manner in which identifiers are employed to perform a test on the component 104 is provided with respect to FIG. 1B. More particularly, FIG. 1B illustrates a call graph 150 created from a sequence of calls captured by the run-time infrastructure 108. As shown, the call graph 150 identifies a test suite 152 and a test case 154. In this example, the test suite 152 has an identifier equal to "1" and the test case 154 has an identifier equal to "2". As such, the test program 102 is configured to perform the test case 154 identified by the test suite identifier "1" and the test case identifier "2".

In addition, the test program 102 appends the identifiers of the test suite 152 and the test case 154 to call A 156 sent to the component 104. The run-time infrastructure 108 may merge the test case identifier and test suite identifier for the test case 154 into a single unique identifier. In response to the call A 156 and the appended identifier, the component 104 makes three calls, shown as call B1 158, call B2 160, and call B3 162, to the stub components 106a, 106b, and 106c, respectively. The identifier is also appended to the three calls B1 158, B2 160, and B3 162. In response to the respective calls and the appended identifier, the stub components 106a, 106b, and 106c may switch their behaviors in some respect, as described in greater detail herein below, after the stub components 106a, 106b, and 106c retrieve the test case identifier and the test suite identifier, from the appended identifier that propagates in the run-time infrastructure 108 along the call sequence. As an example, however, the stub component 106b may respond to the component 104 with calls C1 164 and C2 166. The component 104 may then perform a function based upon the response received from the stub component 106b. In this regard, the interactions between the component 104 and the stub components 106a-106n may be tested. As such, the calls depicted in the call graph 150 may be used by a programmer to determine if the programming interactions between two or more components are operating correctly.

Figure 2:
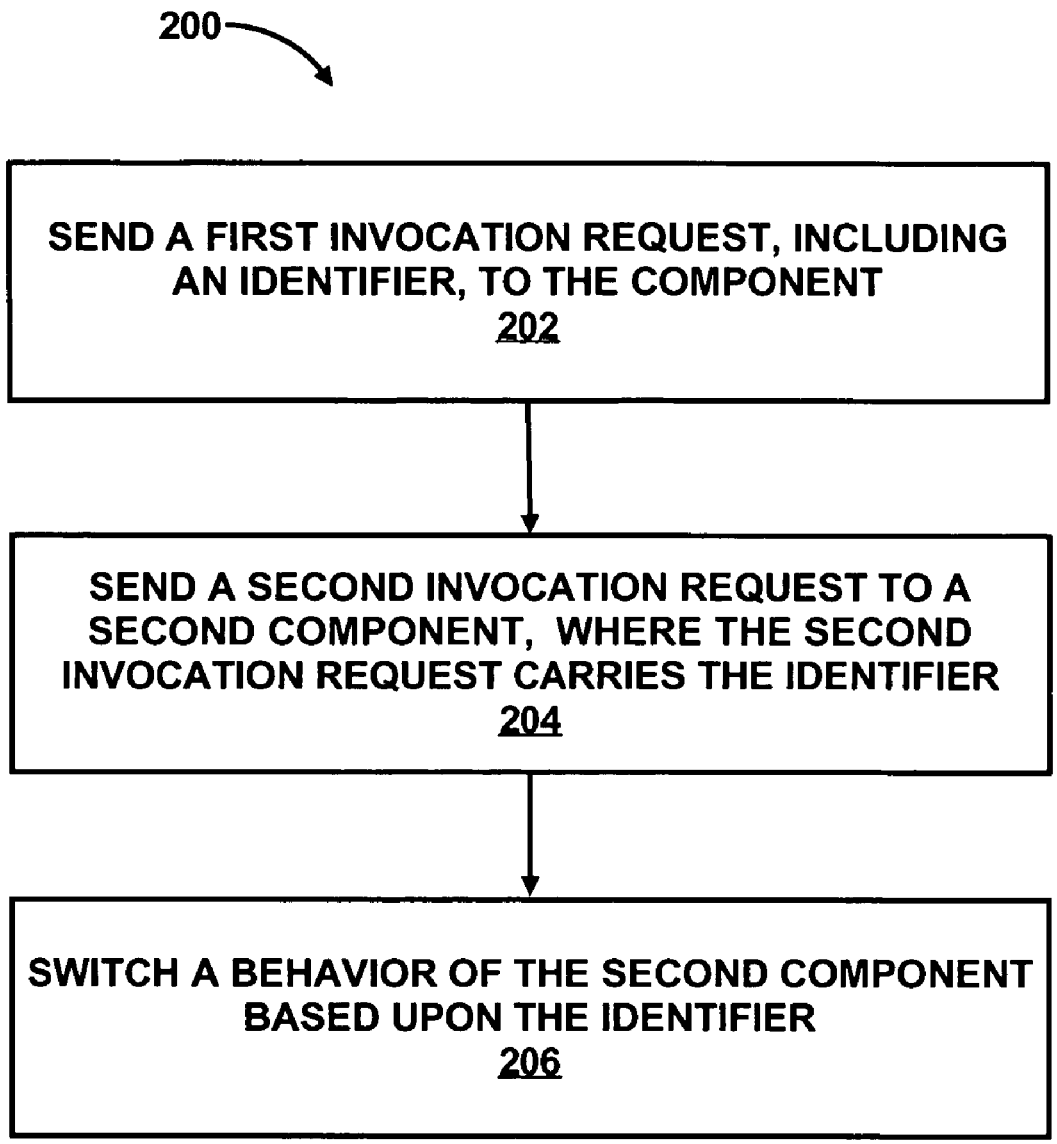
FIG. 2 shows a flow diagram of an operational mode of a method for testing a component of a distributed system in accordance with an embodiment of the invention.

With reference now to FIG. 2, there is shown a flow diagram of a method 200 for testing a component 104 of a distributed system. The following description of the method 200 is made with reference to the system 100 illustrated in FIG. 1A, and thus makes reference to the elements cited therein. The following description of the method 200 is one manner of a variety of different manners in which the system 100 may be implemented. In addition, it should be understood that the method 200 shown in FIG. 2 is not limited to being implemented by the elements shown in FIG. 1A and may be implemented by more, less, or different elements as those shown in FIG. 1A.

As shown in the method 200, the test program 102 sends a first invocation request, including an identifier, to the component 104 at step 202. In other words, the test program 102 sends a call to the component 104, as indicated by the arrows 120a and 120b, to perform a test on the component 104. Appended to the call is an identifier, such as the test case identifier and/or the test suite identifier described hereinabove. The identifier is henceforth propagated in the system 100, for instance, as shown and described above with respect to FIG. 1B.

More particularly, for instance, the test program 102 sends the call with the identifier to the run-time infrastructure 108, as identified by the arrow 120a. In addition, the call and the identifier are sent from the run-time infrastructure 108 to the component 104 as indicated by the arrow 120b. In this regard, the run-time infrastructure 108 may track the call and the identifier sent from the test program 102 to the component 104.

At step 204, the component 104 sends a second invocation request, which includes the identifier from the first invocation request sent from the test program 102, to a second component, such as, the stub component 106a, as indicated by the arrows 122a and 122b. More particularly, the arrows 122a and 122b indicate that the second invocation request is also sent through the run-time infrastructure 108. In one respect, therefore, the run-time infrastructure 108 may also track the second invocation request sent from the component 104 to the second component, such as, the stub component 106a.

In response to the second invocation request and the identifier, the second component switches its behavior at step 206. In other words, the second component switches its behavior as called for by the identifier. For instance, the second component may switch its behavior to emulate a predefined response associated with the identifier. In keeping with the example above, the second component may switch its behavior to not respond, to respond after a significant delay, to respond with a relatively large work load, etc. By switching the behavior of the second component, the component 104 may be tested under various different possible scenarios.

Figure 3:
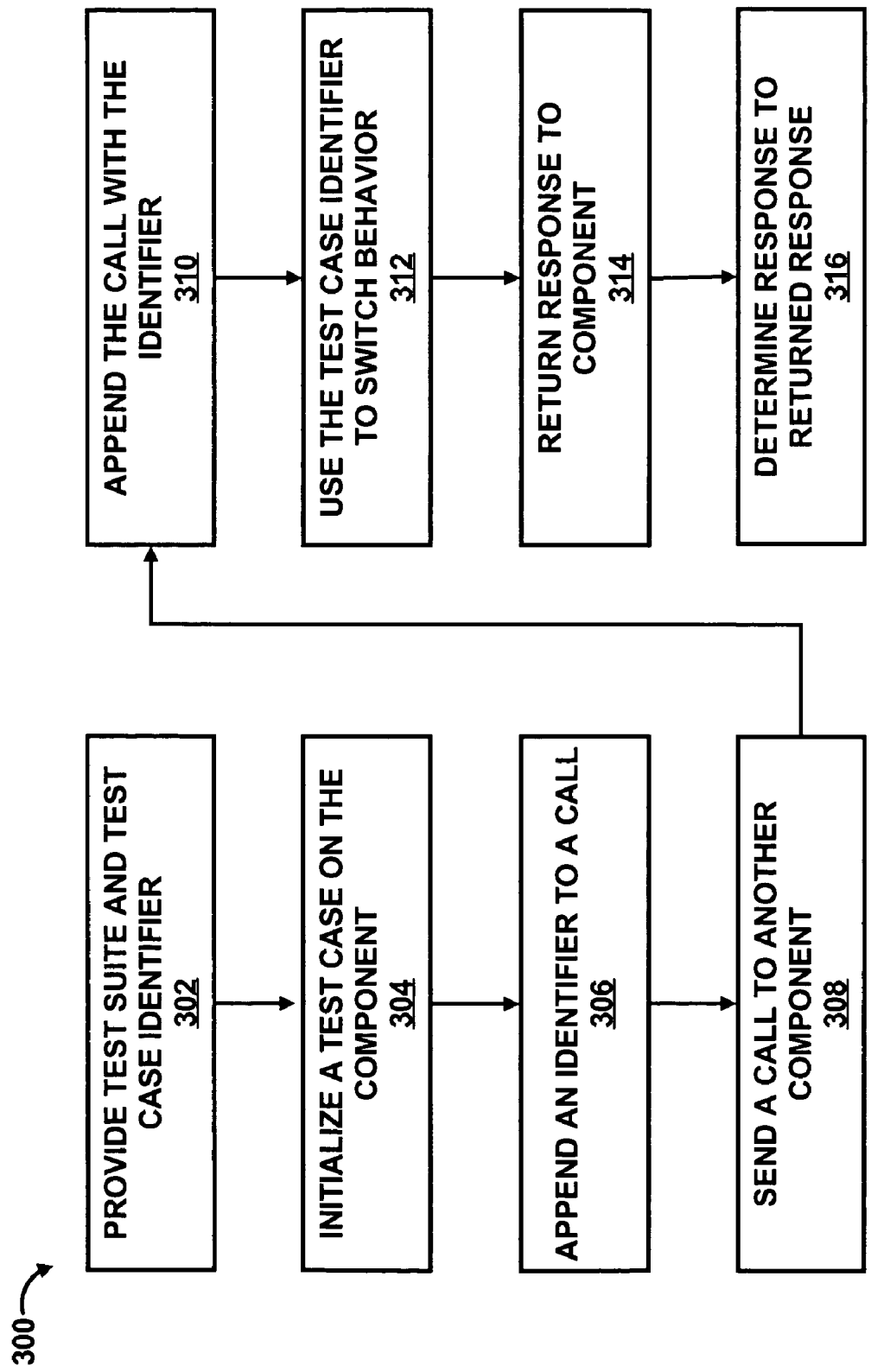
FIG. 3 shows a flow diagram of an operational mode of a method for testing a component of a distributed system in accordance with another embodiment of the invention.

Turning now to FIG. 3, there is shown a flow diagram of a method 300 for testing a component of a distributed system according to another example. The following description of the method 300 is made with reference to the system 100 illustrated in FIG. 1A, and thus makes reference to the elements cited therein. The following description of the method 300 is one manner of a variety of different manners in which the system 100 may be implemented. In addition, it should be understood that the method 300 shown in FIG. 3 is not limited to being implemented by the elements shown in FIG. 1A and may be implemented by more, less, or different elements as those shown in FIG. 1A.

As shown in FIG. 3, a test suite with test cases including a test suite identifier and test case identifiers is provided to the test program 102 by, for instance, a user, at step 302. At step 304, the test program 102 may initialize a test case on the component 104. The test initialization may be performed prior to execution of a test case and may include sending of an identifier into a storage area of the run-time infrastructure 108 via a utility function call supported by a testing utility library. To substantially avoid conflict due to concurrent thread execution, the storage area of the run-time infrastructure 108 may be private to the thread that is running the test program 102.

As a result of the test initialization, the identifier, which may be the merging of the test suite identifier and test case identifier, is sent to the run-time infrastructure 108 at step 304. At step 306, the test program 102 invokes a call to the component 104, and the run-time infrastructure 108 appends the stored identifier to the call request message, as indicated by the arrows 120a and 120b. More particularly, in the run-time infrastructure 108, the call from the test program 102 is translated into a call request message. In addition, the identifier is retrieved from the storage area of the run-time infrastructure 108 and appended to the call request message sent to the component 104.

The identifier is propagated in the system 100, following the call chain that occurs between the component 104 and the stub components 106a-106n. As the identifier propagates through the system 100, the run-time infrastructure 108 may maintain a record of the relationships between the identifier and the calls both from and to the component 104. The run-time infrastructure 108 may also track communications between the component 104 and the stub components 106a-106n.

In response to the call invoked by the test program 102, the component 104 sends a call to another component, the stub component 106a, as indicated by the arrows 122a and 122b, at step 308. As shown by the arrows 122a and 122b, the call is sent to the run-time infrastructure 108 prior to being sent to the stub component 106a. The run-time infrastructure 108 appends the call from the component 104 to the stub component 106a with the identifier at step 310, and the call is sent to the stub component 106a with the identifier.

At step 312, the stub component 106a switches behavior based upon the identifier retrieved from the run-time infrastructure 108. At step 314, the stub component 106a returns a predetermined response in accordance with the switch in behavior to the component 104, as indicated by the arrows 124a and 124b, to test the component 104 based upon the switched behavior. The response to the component 104 may include, for instance, responses designed to emulate various conditions that may occur between the component 104 and various other components. For example, the stub component 106a may return an error code, an expected or unexpected value, a relatively large file, etc. In certain situations, however, the identifier may cause the stub component 106a to not respond until a predetermined period of time has elapsed. This situation may simulate a condition where a program running on a remote server is unavailable for a period of time. These responses are thus designed to test the ability of the component 104 to respond under various possible conditions.

In addition, at step 316, after the response is returned from the stub component 106a, the component 104 responds to the response returned from the stub component 106a based on the implementation of the component 104 and sends back a response to the test program 102, as indicated by the arrows 132a and 132b. The test program 102 then evaluates the response from the component 104 resulting from the switch in behavior of the stub component 106a, at step 318.

Figure 4:
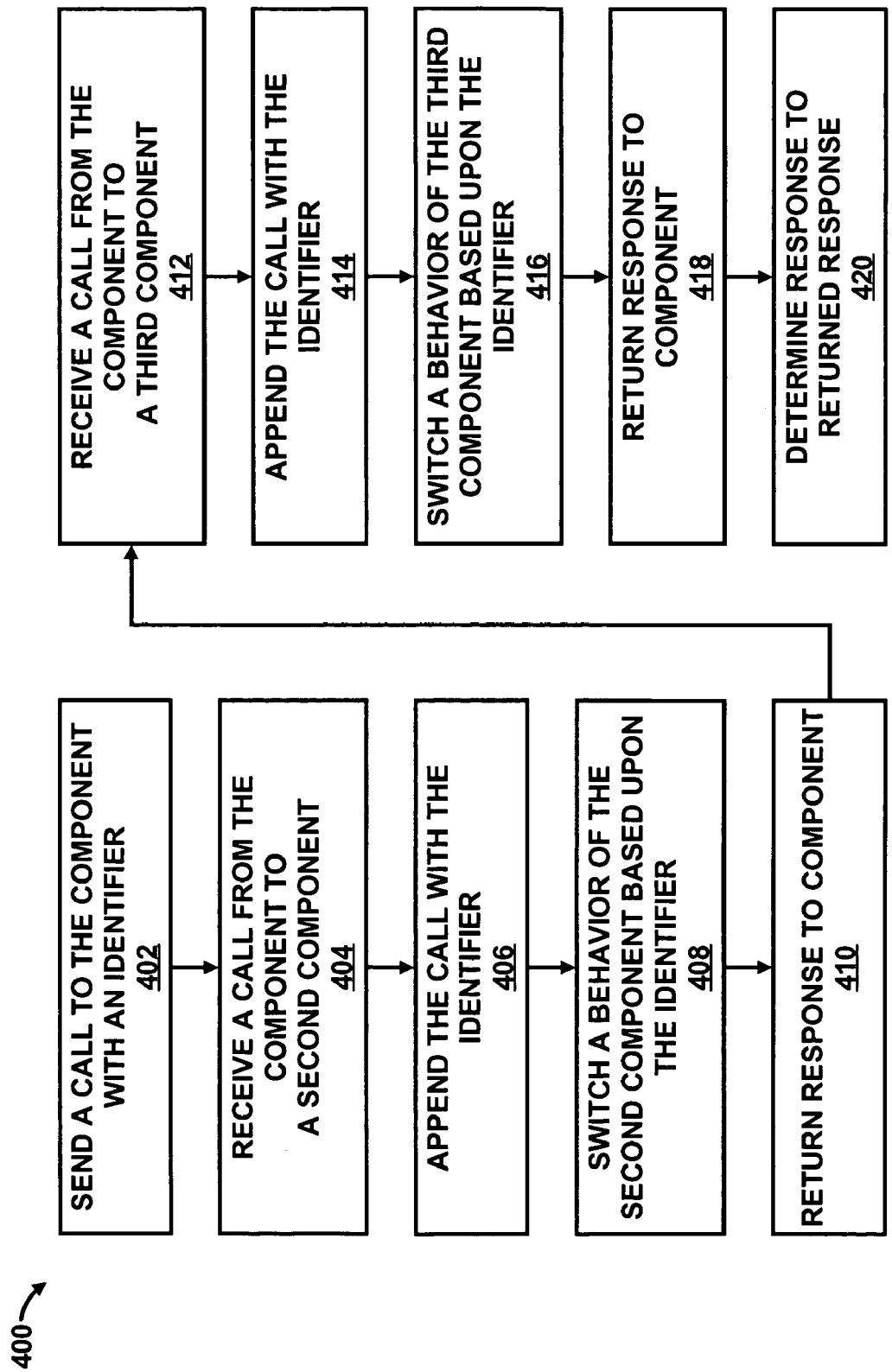
FIG. 4 shows a flow diagram of an operational mode of a method for testing a component of a distributed system in accordance with another embodiment of the invention.

With reference now to FIG. 4, there is shown a flow diagram of a method 400 for testing a component of a distributed system, according to a further example. The following description of the method 400 is made with reference to the system 100 illustrated in FIG. 1A, and thus makes reference to the elements cited therein. The following description of the method 400 is one manner of a variety of different manners in which the system 100 may be implemented. In addition, it should be understood that the method 400 shown in FIG. 4 is not limited to being implemented by the elements shown in FIG. 1A and may be implemented by more, less, or different elements as those shown in FIG. 1A.

As shown in the method 400, a call, with an identifier, is sent to the component 104 by the test program 102 at step 402. As described above with respect to FIG. 3, the call from the test program 102 and the identifier may be sent through the run-time infrastructure 108. The identifier is propagated in the system 100 following a call chain that occurs between the component 104 and the stub components 106a-106n. More particularly, for instance, the component 104 may respond to the call by sending a call to a second component, in this case, the stub component 106a, as indicated by the arrows 122a and 122b. The call from the component 104 may be received by the run-time infrastructure 108 as indicated at step 404 and the run-time infrastructure 108 may append the call with the identifier at step 406. In addition, the call and the identifier may be sent to the stub component 106a as indicated by the arrow 122b.

At step 408, the stub component 106a switches behavior based upon the identifier. In addition, the stub component 106a returns a predetermined response in accordance with the switch in behavior to the component 104, as indicated by the arrows 124a and 124b, at step 410. The component 104 may respond to the response from the stub component 106a by sending a call to a third component, in this case, the stub component 106b, as indicated by the arrows 126a and 126b. The call from the component 104 may be received by the run-time infrastructure 108 as indicated at step 412 and the run-time infrastructure 108 may append the identifier to the call at step 414. In addition, the call and the identifier may be sent to the stub component 106b as indicated by the arrow 126b.

At step 416, the stub component 106b switches behavior based upon the identifier. In addition, the stub component 106b returns a predetermined response in accordance with the switch in behavior to the component 104, as indicated by the arrows 128a and 128b, at step 418. In addition, at step 420, the response by the component 104 to the switch in behavior of the stub components 106a and 106b is determined based upon the implementation of the component 104. In addition, a response from the component 104 is returned to the test program 102, as indicated by the arrows 132a and 132b. The test program 102 then evaluates the response to determine how the component 104 responds to the switch in behavior of the stub component 106a and the stub component 106b, as indicated at step 422.

Although not shown, the component 104 may also respond to the response from the stub component 106b by sending a call to a fourth component, and so on. This process may continue with any number of test cases in a test suite and may be scaled to take into account any reasonably suitable number of stub components 106a-106n. The detailed representation of the identifier may be updated, for instance, when the test program 102 determines that execution of the current test case has been finished. In addition, the test program 102 may initiate the execution of a new test case with a new identifier following completion of the current test case.

Figure 5:
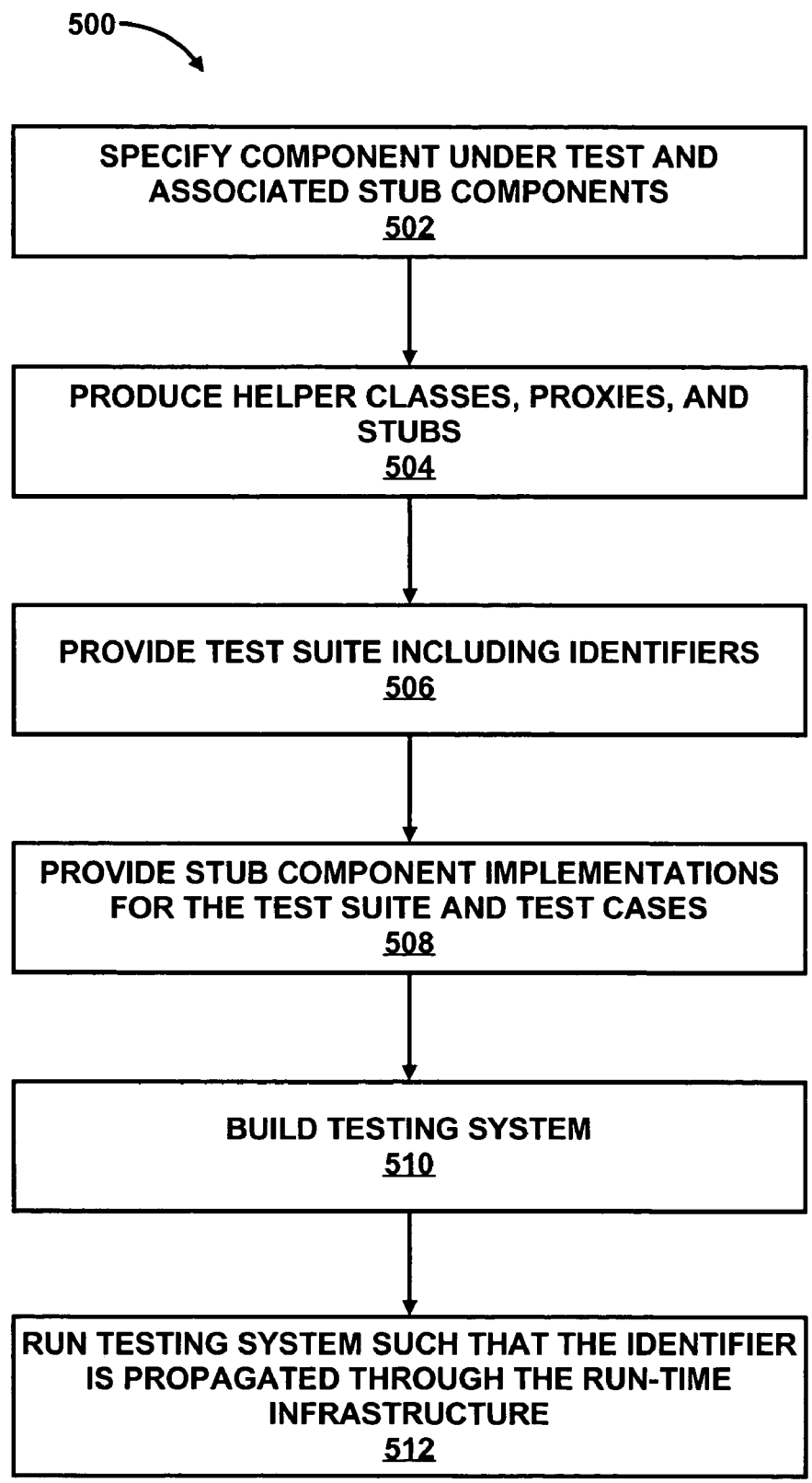
FIG. 5 shows a flow diagram of a method for implementing stub components for a test suite in accordance with an embodiment of the invention.

FIG. 5 shows a flow diagram of a method 500 for implementing stub components for a test suite and building a testing system for testing a component in a distributed system. The following description of the method 500 is made with reference to the system 100 illustrated in FIG. 1A, and thus makes reference to the elements cited therein. The following description of the method 500 is one manner of a variety of different manners in which the system 100 may be implemented. In addition, it should be understood that the method 500 shown in FIG. 5 is not limited to being implemented by the elements shown in FIG. 1A and may be implemented by more, less, or different elements as those shown in FIG. 1A.

In the method 500, the component 104 to be tested is specified along with the stub components 106a-106n associated with the component 104, at step 502. More particularly, at step 502, a user may specify which component 104 is under test and which stub components 106a-106n are associated with or are otherwise configured to interact with the component 104. In addition, the user may provide test-oriented implementations for the stub components 106a-106n to generally enable free-will implementations of the stub components 106a-106n. In this regard, for instance, a relatively broad range of testing scenarios may be validated, independent of the actual implementations of the stub components 106a-106n.

At step 504, helper classes, proxies, and stubs are produced using a compiler. The compiler may be employed to automatically produce the helper classes, proxies, and stubs to substantially enable remote accessibility between the component 104 and the stub components 106a-106n. At step 506, a test suite having identifiers associated with the test suite is provided. The test suite may be associated with a test plan for the test program 102 and may thus include test cases with identifiers.

At step 508, stub component 106a-106n implementations are provided for the test suite and test cases. The implementations of the stub components 106a-106n may be provided by the user. In addition, in each implementation of the stub components 106a-106n, the user may use the application program interface (API) determined from a run-time monitoring to retrieve the test suite identifiers and the test case identifiers. The implementations of the stub components 106a-106n may be provided to coordinate various behaviors of the stub components 106a-106n with these identifiers.

At step 510, the testing system, which may be represented as at least one executable code, is built based upon the manually implemented code and the code generated by the compiler. The testing system is then run and the identifier propagates through the run-time infrastructure 108 to the component 104 and each stub component 106a-106n called by the component 104 at step 512, as described in greater detail herein above with respect to FIGS. 2-4.

Some or all of the steps illustrated in the methods 200, 300, 400, and 500 may be contained as a utility, program, subprogram, in any desired computer accessible medium. In addition, the methods 200, 300, 400, and 500 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which includes storage devices.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Concrete examples of the foregoing include distribution of the programs on a CD ROM It is therefore to be understood that those functions enumerated below may be performed by any electronic device capable of executing the above-described functions.

Figure 6:
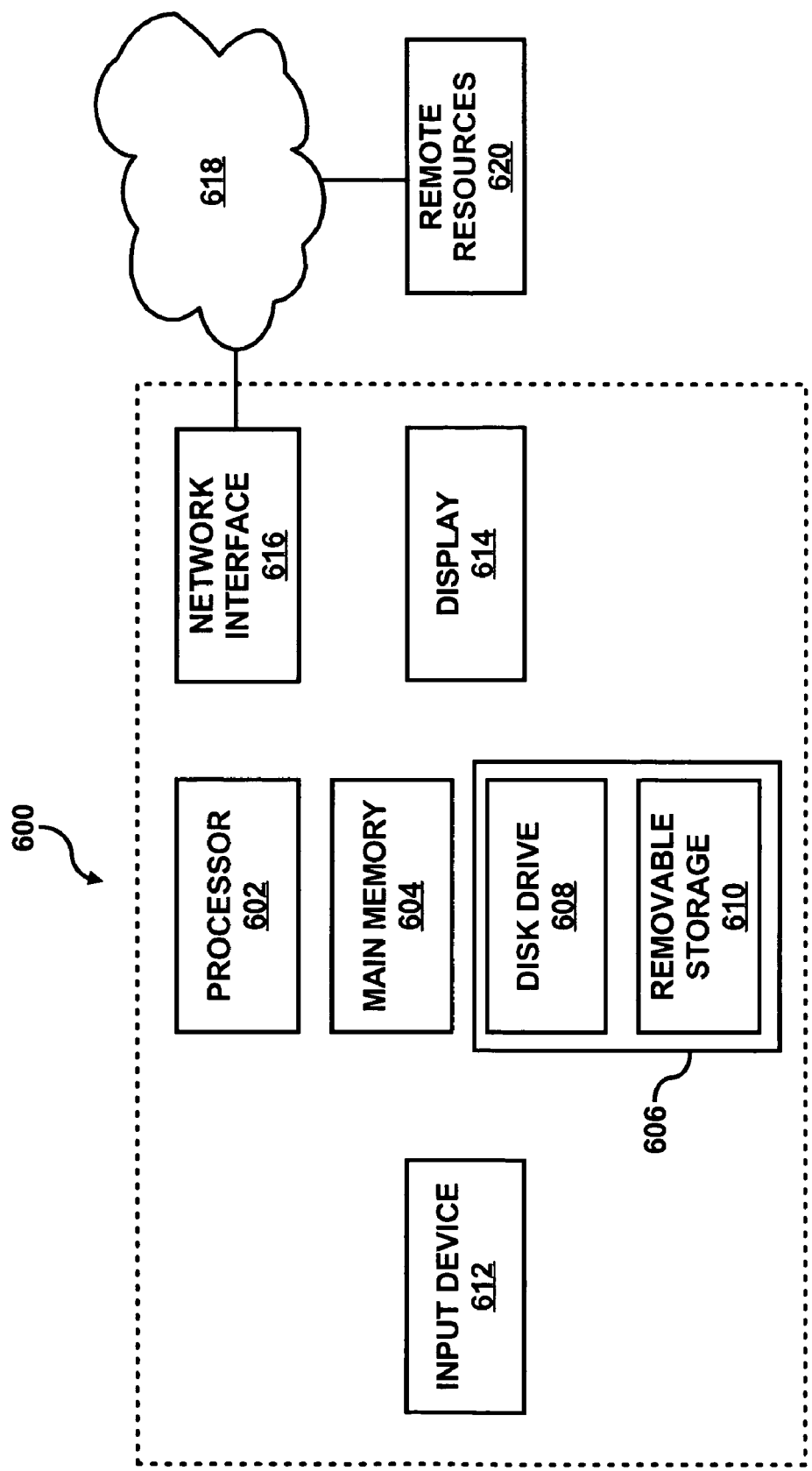
FIG. 6 shows a schematic diagram of a computer system in which embodiments of the invention may be implemented.

FIG. 6 illustrates a block diagram of a computer system 600 that may implement some of the methods shown in FIGS. 2-5. The computer system 600 includes one or more processors, such as processor 602, providing an execution platform for executing software. The processor 602 may also execute an operating system (not shown) for executing the software in addition to performing operating system tasks.

The computer system 600 also includes a main memory 604, such as a Random Access Memory (RAM), providing storage for executing software during run-time and mass storage 606. The mass storage 606 may include a hard disk drive 608 and/or a removable storage drive 610, representing a floppy diskette drive, a magnetic tape drive, a compact disk drive, or a nonvolatile memory where a copy of software or data may be stored. Applications and resources may be stored in the mass memory 606 and transferred to the main memory 604 during run time. The mass memory 606 may also include ROM (read only memory), EPROM (erasable, programmable ROM), EEPROM (electrically erasable, programmable ROM).

A user interfaces with the computer system 600 with one or more input devices 612, such as a keyboard, a mouse, a stylus, or any other input device and views results through a display 614. A network interface 616 is provided for communicating through a network 618 with remote resources 620. The remote resources 620 may include servers, remote storage devices, data warehouses, or any other remote device capable of interacting with the computer system 600.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method for testing a component of a distributed system, the method comprising steps performed by a processor of:
   sending a first invocation request to the component, wherein the first invocation request includes an identifier;
   sending a second invocation request to a second component, wherein the second invocation request carries the identifier from the first invocation request and wherein the second component is configured to interact with the component by emulating one or more behaviors predicted to occur during implementation of the component;
   switching a behavior of the second component based upon the identifier; and
   testing the component based upon an interaction between the component and the second component in response to the switch in behavior of the second component.

2. The method of claim 1, further comprising:
   appending the identifier to the first invocation request sent to the component; and
   appending the identifier to the second invocation request sent to the second component.

3. The method of claim 1, further comprising:
   returning a response to the component in accordance with the switch in behavior of the second component; and
   evaluating a response from the component to thereby test the component based upon the switch in behavior of the second component.

4. The method of claim 1, further comprising:
   initiating a test on the component with a test suite configured to test interactions between the component and the second component, wherein the second component comprises a stub component.

5. The method of claim 4, further comprising:
   providing a test suite identifier and a test case identifier in the test suite, wherein the identifier comprises the test suite identifier and the test case identifier; and
   sending the identifier to a run-time infrastructure during execution of a test case.

6. The method of claim 5, further comprising:
   in the run-time infrastructure, tracking calls made between the component and the stub component.

7. The method of claim 5, further comprising:
   receiving a third call from the component to a third component, wherein the third call is sent from the component in response to a switch in behavior of the stub component;
   appending the identifier to the third call;
   switching a behavior of the third component based upon the identifier.

8. The method of claim 7, further comprising:
   returning a response to the component in accordance with the switch in behavior of the third component; and
   evaluating a response from the component to thereby test the component based upon the switch in behavior of the second component and the third component.

9. A method for switching behavior of a stub component in a distributed system, the method comprising steps performed by a processor of:
   maintaining a relationship between a component under test and an identifier, wherein the identifier is configured to provide instructions to the stub component;
   tracking communications between the component under test and the stub component using the identifier, wherein the stub component is configured to interact with the component under test by emulating one or more behaviors predicted to occur during implementation of the component under test; and
   using the identifier to evaluate conditions in the stub component such that a behavior of the stub component switches depending on the identifier to vary an interaction between the stub component and the component under test.

10. The method of claim 9, wherein the identifier comprises a test suite identifier and a test case identifier, the method further comprising:
    sending the identifier to a run-time infrastructure during execution of a test case, and wherein the step of tracking communications further comprises employing the run-time infrastructure to track communications between the component under test and the stub component.

11. A method for building a testing system for testing a component in a distributed system containing stub components, said method comprising steps performed by a processor of:
    specifying the component and associated stub components, wherein the component is configured to be tested based upon an interaction of the component and the associated stub components based upon a switch in behavior of the associated stub components, and wherein the associated stub components are configured to interact with the component by emulating one or more behaviors predicted to occur during implementation of the component;

producing helper classes, proxies and stubs configured to enable remote accessibility between the component and the associated stub components;

providing a test suite having identifiers;

providing implementations for the stub components for the test suite; and building the testing system in the form of at least one executable code, wherein the executable code is based upon the component, the associated stub components, the helper classes, proxies and stubs, the test suite, and the implementations for the stub components.

12. The method of claim 11, further comprising:

running the testing system such that the identifier is propagated through a run-time infrastructure configured to track propagation of calls made in the testing system.

13. A computer readable medium on which is embedded one or more computer programs, said one or more computer programs implementing a method for testing a component of a distributed system, said one or more computer programs comprising a set of instructions for:

appending an identifier to a first call sent to the component;

receiving a second call sent from the component to a second component, wherein the second component is configured to interact with the component during a test of the component by emulating one or more behaviors predicted to occur during implementation of the component;

appending the identifier to the second call, wherein the identifier is configured to provide instructions to the second component;

in the second component, responding to the second call in a manner dependent upon the identifier; and testing the component based upon an interaction between the component and the second component in response to the response of the second component to the identifier.

14. The computer readable medium according to claim 13, the one or more computer programs further comprising a set of instructions for:

initiating a test on the component with a test suite configured to test interactions between the component and the another component;

providing a test suite identifier and a test case identifier in the test suite, wherein the identifier comprises the test suite identifier and the test case identifier; and sending the identifier to a run-time infrastructure during execution of a test case.

15. The computer readable medium according to claim 14, the one or more computer programs further comprising a set of instructions for:

returning the response from the second component to the component; and evaluating a response from the component to thereby test the component.

16. A computer readable medium storing code for a testing system, said code for the testing system comprising:

code identifying a component under test;

code identifying a test suite having an identifier;

code identifying a stub component configured to interact with the component under test by emulating one or more behaviors predicted to occur during implementation of the component under test; and code identifying a run-time infrastructure configured to append the identifier to calls sent from the component under test to the stub component, wherein the stub component switches behavior based on the identifier received from the component under test, and wherein the component under test is configured to be tested based upon an interaction between the component under test and the stub component in response to the switch in behavior of the stub component.

17. The computer readable medium of 16, wherein the identifier further comprises a test suite identifier and a test case identifier and wherein the stub component is configured to evaluate the test case identifier to switch behavior.

18. The computer readable medium of 17, wherein the code identifying the stub component is configured to return a response to the component in accordance with the switch in behavior of the stub component, and wherein the code identifying the component responds based upon the switch in behavior of the stub component.

19. The computer readable medium of 16, wherein the code identifying the run-time infrastructure is further configured to maintain a sequence of calls from the component under test and responses to the component under test.

20. A testing system comprising:

means for maintaining a relationship between a component under test and an identifier of a test suite, wherein the identifier is configured to provide instructions to the component;

means for tracking communications between the component under test and a stub component using the identifier, wherein the stub component is configured to interact with the component under test by emulating one or more behaviors predicted to occur during implementation of the component under test; and means for evaluating a condition in the stub component such that a behavior of the stub component varies depending on the identifier to vary an interaction between the stub component and the component under test.

* * * * *

UNITED STATES PATENT AND TRADEMARK OFFICE
CERTIFICATE OF CORRECTION

PATENT NO. : 7,730,452 B2  Page 1 of 1
APPLICATION NO. : 11/264799
DATED : June 1, 2010
INVENTOR(S) : Jun Li et al.

It is certified that error appears in the above-identified patent and that said Letters Patent is hereby corrected as shown below:

In column 12, line 25, in Claim 17, delete "16," and insert -- claim 16, --, therefor.

In column 12, line 29, in Claim 18, delete "17," and insert -- claim 17, --, therefor.

In column 12, line 35, in Claim 19, delete "16," and insert -- claim 16, --, therefor.

Signed and Sealed this

Twenty-third Day of November, 2010

David J. Kappos
*Director of the United States Patent and Trademark Office*